United States Patent

Komori et al.

[11] Patent Number: 5,956,679
[45] Date of Patent: Sep. 21, 1999

[54] SPEECH PROCESSING APPARATUS AND METHOD USING A NOISE-ADAPTIVE PMC MODEL

[75] Inventors: Yasuhiro Komori, Kawasaki; Hiroki Yamamoto, Yokohama, both of Japan

[73] Assignee: Canon Kabushiki Kaisha, Tokyo, Japan

[21] Appl. No.: 08/982,385

[22] Filed: Dec. 2, 1997

[30] Foreign Application Priority Data

Dec. 3, 1996 [JP] Japan .................................. 8-336291

[51] Int. Cl.[6] ......................................................... G10L 5/06
[52] U.S. Cl. ........................... 704/256; 704/255; 704/236
[58] Field of Search ..................................... 704/236, 255, 704/256

[56] References Cited

U.S. PATENT DOCUMENTS

| | | | |
|---|---|---|---|
| 5,787,396 | 7/1998 | Komori et al. | 704/255 |
| 5,797,116 | 8/1998 | Yamada et al. | 704/244 |
| 5,812,975 | 9/1998 | Komori et al. | 704/256 |

Primary Examiner—David R. Hudspeth
Assistant Examiner—Susan Wieland
Attorney, Agent, or Firm—Fitzpatrick, Cella, Harper & Scinto

[57] ABSTRACT

A speech processing apparatus includes a noise model production device for extracting a noise-speech interval from input speech data and producing a noise model by using the data of the extracted interval. The apparatus also includes a composite distribution production device for dividing the distributions of a speech model into a plurality of groups, producing a composite distribution of each group, and determining the positional relationship of each distribution within each group. In addition, the apparatus includes a memory for storing each composite distribution and the positional relationship of each distribution within the group, and a PMC conversion device for PMC-converting each produced composite distribution. Also provided is a noise-adaptive speech model production device for producing a noise-adaptive speech model on the basis of the composite distribution which is PMC-converted by the PMC conversion device and the positional relationship stored by the memory. Further, the apparatus includes an output device for determining and outputting a recognition result and a candidate with their likelihood for the input speech data by using the produced noise-adaptive speech model.

24 Claims, 7 Drawing Sheets

SPEECH PROCESSING APPARATUS AND METHOD USING A NOISE-ADAPTIVE PMC MODEL

BACKGROUND OF THE INVENTION

1. Field of the Invention

The present invention relates to a speech processing apparatus and a method for recognizing input speech. More particularly, the present invention relates to a speech processing apparatus and a method capable of handling speech input in a noisy environment.

2. Description of the Related Art

In recent years, in order to make speech recognition practical, preventing noise in the environment of use from interfering with speech recognition has been actively researched. Among the research, a PMC method capable of producing a noise-adaptive speech model in which a speech model is adapted from a small amount of noise data has been proposed.

FIG. 7 is a conceptual view illustrating the flow of a noise adaptation process in a PMC method.

As shown in FIG. 7, in a noise adaptation process in the PMC method, initially, cosine transform processes 601 and 602 and exponential transform processes 603 and 604 are performed in sequence on a speech model (speech HMM (Hidden Markov Model)) and a noise model (noise HMM), respectively, and a process 605 for synthesizing the results is performed. Then, by performing a logarithmic transform process 606 and an inverse cosine transform process 607 on the synthesized result, a noise-adaptive speech model (PMC-HMM) is obtained.

Circles are schematic representations of the HMM state. Arrows are schematic representations of the state transition. The cluster of circles and arrows are schematic representations of the HMM model. The serrations represent the waveform of sound. The left upper part of the figure shows the phoneme model and the waveform thereof. The left lower part of the figure shows a noise model and the waveform thereof. The right upper part of the figure shows a noise-superposed speech model and the waveform thereof.

However, in this PMC method, if the number of types of speech models is increased or the number of distributions is increased to increase the recognition performance, a very large amount of processing is required because all distributions are PMC-converted in a conventional PMC method.

As described above, in a conventional speech recognition method, when a detailed speech model (a majority model and a majority distribution) is noise-adapted by using a small amount of noise data by a PMC method, there arises the problem that a very large amount of processing is required because all distributions are PMC-converted in the conventional PMC method.

SUMMARY OF THE INVENTION

Accordingly, it is an object of the present invention to provide a speech processing apparatus and a speech processing method capable of performing high-speed noise adaptation for a speech model.

In view of the above-described art, the present invention makes it possible to cause a detailed speech model having a majority model and a majority distribution to be noise-adapted at a high speed.

The present invention makes high-speed and high-performance speech recognition possible by a high-speed noise adaptation process.

According to one aspect, the present invention which achieves these objectives relates to a speech processing apparatus, comprising noise model production means for extracting a non-speech interval from input data and producing a noise model by using the data of the extracted interval. The apparatus also includes composite distribution production means for dividing the distributions of a speech model into a plurality of groups, and producing a composite distribution of each group, and determining the positional relationship of each distribution and the produced composite distribution within each group. In addition, the apparatus includes storing means for storing each composite distribution and the positional relationship of each distribution and the produced typical distribution within the group, and PMC conversion means for PMC-converting each produced typical distribution. Also provided is noise-adaptive speech model production means for producing a noise-adaptive speech model on the basis of the composite distribution which is PMC-converted by the PMC conversion means and the positional relationship stored by the storing means. Further, the apparatus comprises output means for determining and outputting a recognition candidate and a likelihood that the recognition candidate correctly corresponds to the input speech data by using the noise-adaptive speech model produced by the noise-adaptive speech model production means.

The apparatus also includes speech input means for inputting speech data, sound analysis means for analyzing speech data input by the speech input means, output probability computation means for determining the output probability that the noise-adaptive speech model corresponds to the input speech data analyzed by the analyzing means, and means for determining the recognition result using the noise-adaptive speech model by performing a linguistic search for the input speech data.

The noise-adaptive speech model production means includes determination means for determining: the vectors of difference between the composite distribution and each distribution within the group before PMC conversion, the mean value and the variance of the composite distributions before PMC conversion, and the mean value and the variance of the composite distributions after PMC conversion.

The composite distribution production means forms distributions belonging to each state of the speech model into one group. In addition, the composite distribution production means includes distribution determination means for determining that a particular distribution belongs to a plurality of neighboring groups, and distribution production means for producing one final distribution from a plurality of converted distributions when the distribution belonging to the plurality of groups is converted by each composite distribution. Further, the output means determine the recognition result of the input speech data using the noise-adaptive speech model and a dictionary and grammar as a linguistic constraint.

According to another aspect, the present invention which achieves these objectives relates to a speech processing method, comprising producing, dividing, changing, converting, noise-adaptive speech model producing, and determining steps. The producing step produces a noise model by using data on a noise-speech interval extracted from input speech data. The dividing step divides the distributions of the speech model into a plurality of groups and produces a composite distribution of each group and determines the positional relationship of each distribution within each group. The storing step stores each composite distribution and the positional relationships of the distributions within the groups. The converting step PMC-converts the produced composite distributions. The noise-adaptive speech model producing step produces a noise-adaptive speech model on the basis of the PMC-converted composite distribution and the stored positional relationships. The determining step determines and outputs a recognition candidate and a likelihood that the recognition candidate correctly corresponds to the input speech data by using the produced noise-adaptive speech model.

The method also comprises the steps of inputting speech data, analyzing the input speech data, determining an analysis result of the analyzing step and determining the output recognition probability that the recognition candidate correctly corresponds to the input speech data analyzed in the analyzing step and the analysis result determined therefrom, and determining a recognition result using the noise-adaptive speech model by performing a linguistic search for the input speech data.

The noise-adaptive speech model is produced by using the vectors of difference between the composite distribution and each distribution within the group before PMC conversion, the mean value and the variance of the composite distributions before PMC conversion, and the mean value and the variance of the composite distributions after PMC conversion.

The dividing step forms distributions belonging to each state of the speech model into one group. In addition, the dividing step determines a particular distribution so as to belong to a plurality of neighboring groups, and when the distribution belonging to the plurality of groups is converted by each basic distribution, one final distribution is made to be the basic distribution from the plurality of converted distributions. In addition, the method further comprises the step of using a dictionary and grammar as a linguistic constraint to determine a recognition result for the noise-adaptive speech model.

According to still another aspect, the present invention which achieves these objectives relates to a computer usable storage medium having computer readable program code means embodied therein. The program instructs a computer to perform speech processing. The computer readable program code means comprises first, second, third, fourth, fifth, and sixth program code means. The first program code means instructs the computer to extract a noise-speech interval from input speech data and produce a noise model by using data of the extracted interval. The second program code means instructs the computer to divide the distributions of the speech model into a plurality of groups, to produce a composite distribution of each group, and to determine the positional relationship of each distribution within each group. The third program code means instructs the computer to store each computer distribution and the positional relationships of each distribution within the group. The fourth program code means instructs the computer to PMC-convert the produced composite distribution. The fifth program code means instructs the computer to produce a noise-adaptive speech model on the basis of the composite distribution which is caused to be PMC-converted by the fourth program code means and the positional relationship caused to be stored by the third program code means. The sixth program code means causes the computer to determine and output a recognition candidate and a likelihood that the recognition candidate correctly corresponds to the input speech data by using the noise-adaptive speech model caused to be produced by the fifth program code means.

The computer readable program code means also comprises seventh program code means for causing the computer to input speech data, eighth program code means for causing the computer to analyze the speech data caused to input by the seventh program code means, ninth program code means for causing the computer to determine a sound analysis result from the analysis caused to occur by the eighth program code means and to cause the computer to output a probability that the noise-adaptive speech model corresponds to the input speech data caused to be analyzed by the eighth program code means and the analysis result caused to be produced by the ninth program code means, and means for determining the recognition result using the noise-adaptive speech model by performing a linguistic search for the input speech data.

The fifth program code means comprises determining program code means for causing the computer to determine the vectors of difference between the composite distribution and each distribution within the group before PMC conversion, the mean value and the variance of the composite distributions before PMC conversion, and the mean value and the variance of the composite distributions after PMC conversion, and produces the mean value.

The second program code means causes the computer to form distributions belonging to each state of the speech model into one group. Also, the second program code means includes distribution determination program code for causing the computer to determine that a particular distribution belongs to a plurality of neighboring groups, and distribution production program code means for causing the computer to produce one final distribution from a plurality of converted distributions when the distribution belonging to the plurality of groups is converted by each composite distribution. Also, the output means determine the recognition result of the input speech data using the noise-adaptive speech model and a dictionary and grammar as a linguistic constraint.

The above and further objects, aspects and novel features of the invention will become more apparent from the following detailed description when read in connection with the accompanying drawings.

DESCRIPTION OF THE PREFERRED EMBODIMENT

The embodiment of the present invention will be described below with reference to the accompanying drawings.

Figure 1:
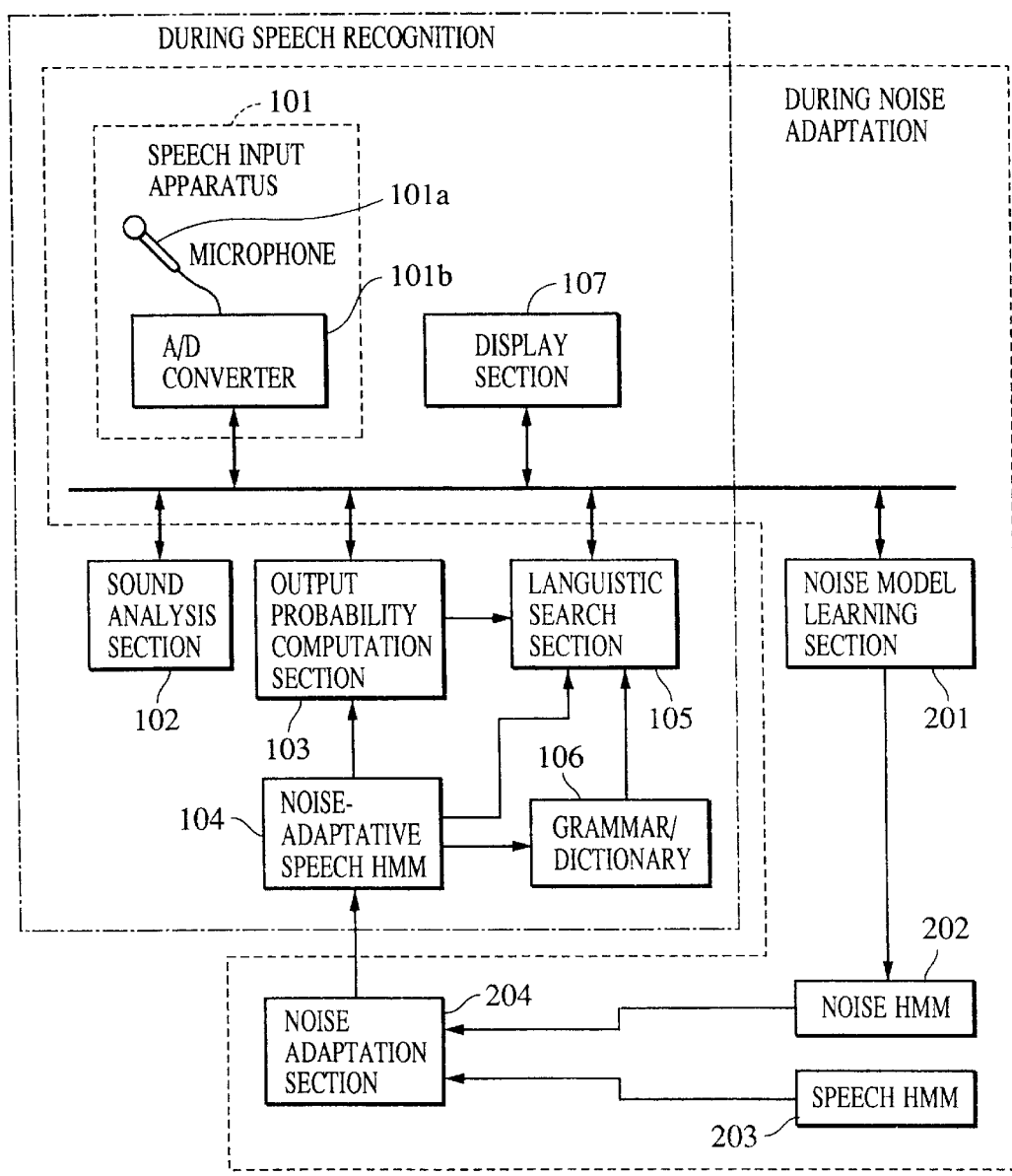
FIG. 1 is a block diagram showing the overall construction of a speech recognition apparatus according to an embodiment of the present invention.

FIG. 1 is a block diagram showing the overall construction of a speech recognition apparatus according to an embodiment of the present invention.

Shown in FIG. 1 are a speech input section 101 including a microphone 101a and an A/D converter 101b, a sound analysis section 102 for determining speech parameters, an output probability computation section 103 for performing output probability computation, a model or noise adaptive speech HMM 104 for speech recognition after noise adaptation, a linguistic search section 105 for performing a linguistic search, a grammar/dictionary 106 for use as a linguistic constraint in language processing (linguistic search), and a display section 107 for displaying and outputting results.

Further shown in FIG. 1 are a noise model learning section 201, a noise model (HMM) 202, a speech model (HMM) 203, and a noise adaptation execution section 204.

Figure 2:
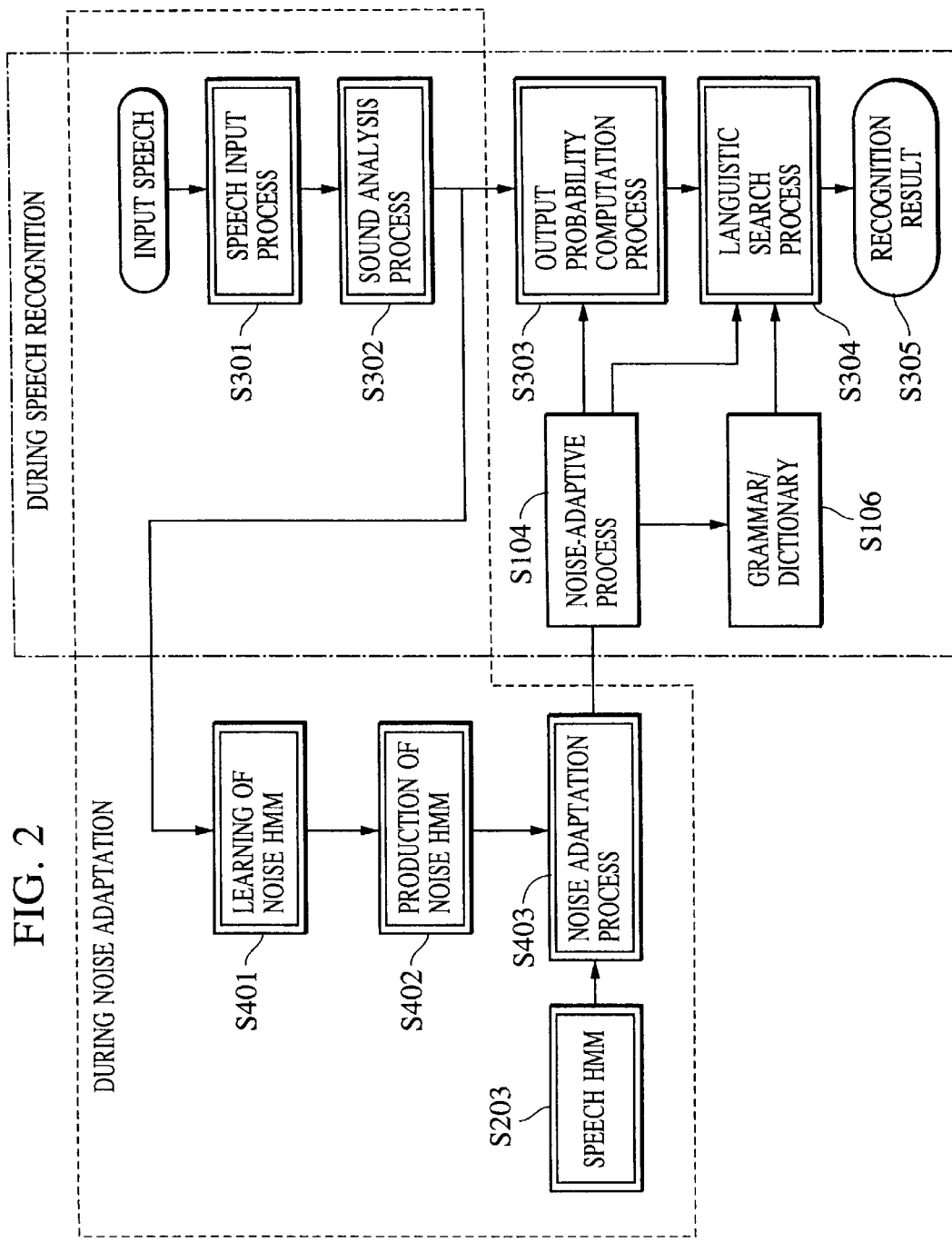
FIG. 2 is a flowchart of the general process according to the embodiment of the present invention.

The speech recognition apparatus of this embodiment is formed of the above-described elements and operates in accordance with the flowchart shown in FIG. 2.

Initially, during speech recognition, speech extracted by the speech input section 101 (step S301) is analyzed to determine speech parameters for each frame by the sound analysis section 102 (step S302), and the state output probability of the noise-adaptive speech model 104 is computed using the noise adaptive speech HMM and the output of the sound analysis section 102 after noise adaptation is performed to produce the noise adaptive speech HMM. The state output probability is the probability that the noise-adaptive speech model 104 corresponds to the input speech analyzed by the sound analysis section 102.

Then, the linguistic search section 105 performs a linguistic search using the grammer/dictionary 106, the noise-adapted speech model 104, the state output probability, in order to calculate the most likely sequence of words and their alternative candidates (linguistic information). The linguistic search section 105 calculates the likelihood of the word sequence using the noise-adaptive speech model under constraint of the the data stored in the grammer/dictionary 106. The language search section 105 determines a recognition candidate for the input speech and the likelihood that the recognition candidate correctly corresponds to the input speech using the analysis result of the sound analysis section 102, the state output probability of the model produced by section 103, and the determined recognition results (step S304).

On the other hand, during noise adaptation, after steps S301 and S302 described above, non-speech data (noise) is extracted from input speech by noise model learning section 201, and the noise model learning section 201 learns a noise model step S401) and produces a noise model (noise HMM) 202 (step S402). By using this noise model 202 and the speech model (speech HMM) 203, the noise adaptation section 204 produces a noise-adaptive speech model (noise-adaptive speech HMM) 104 (step S403).

Figure 3:
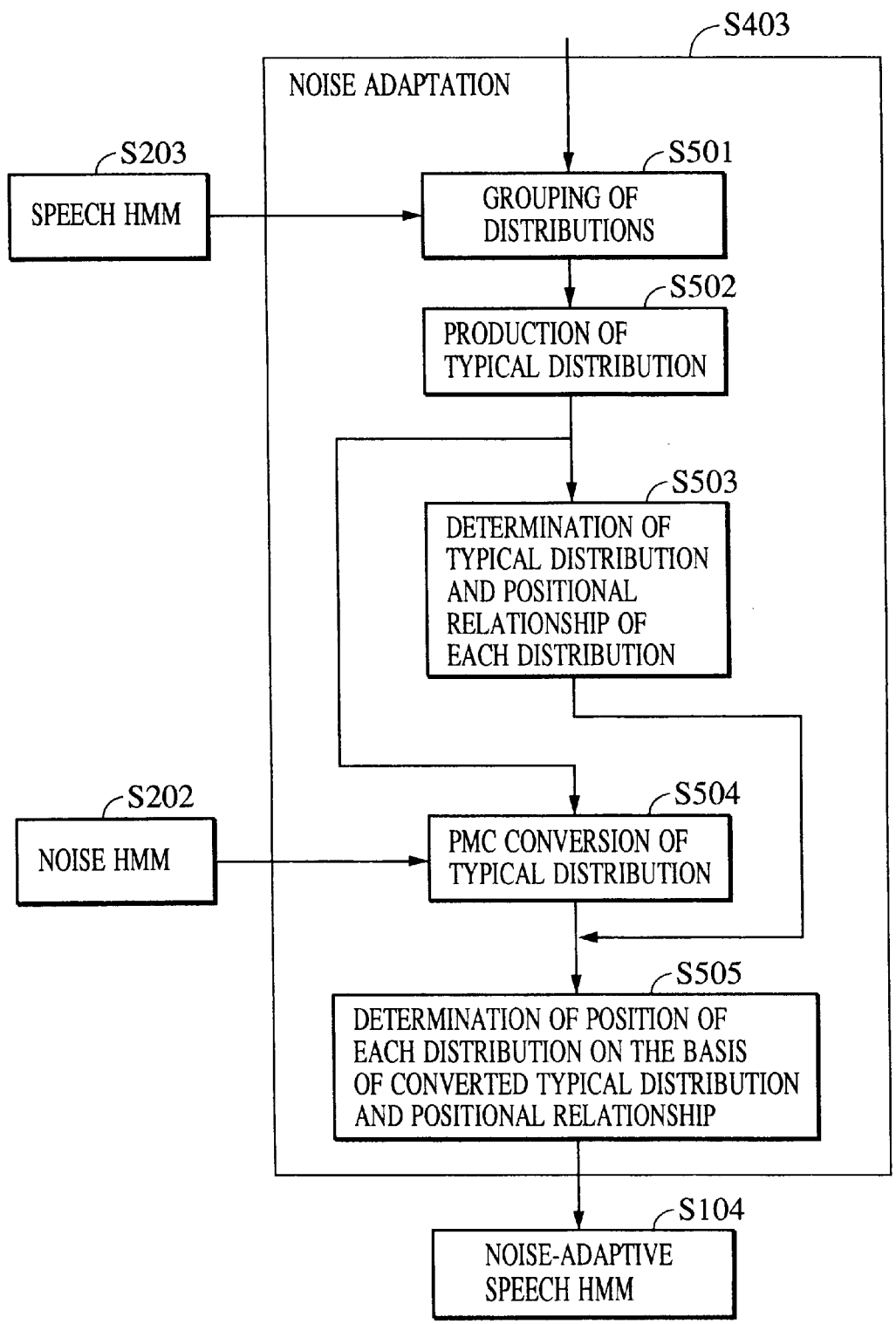
FIG. 3 is a flowchart showing the processing of a noise adaptation section according to the embodiment of the present invention.

Next, the details of the noise adaptation process of step S403 described above will be described with reference to the flowchart of FIG. 3.

Figure 7:
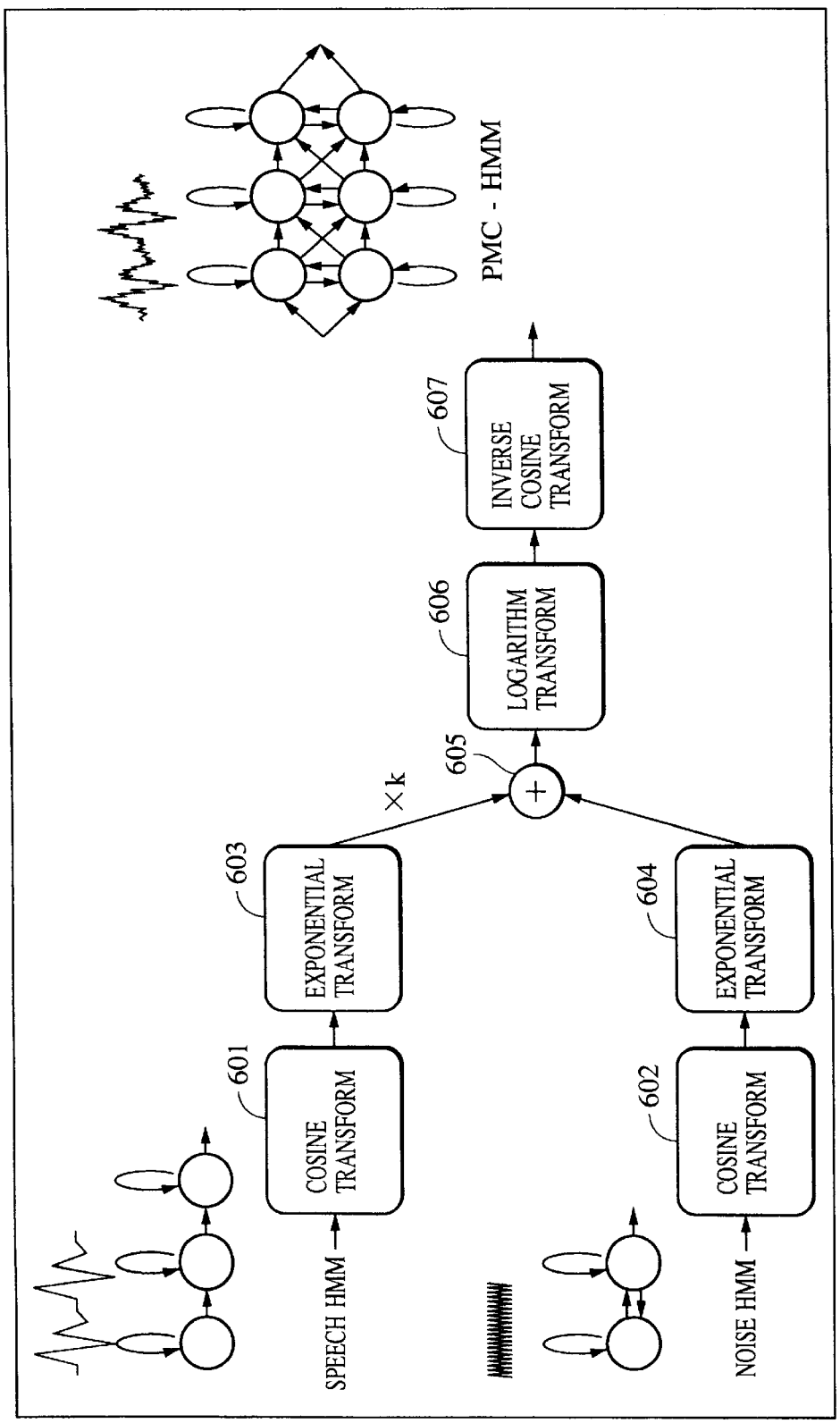
FIG. 7 is a conceptual view illustrating the flow of a noise adaptation process in a PMC method.

Initially, the distributions of the speech model 203 are formed into groups (step S501). More specifically, distributions with a short distance therebetween are formed into one group by the noise adaptation section 204. A typical distribution is produced by using the distributions belonging to each group (step S502). This typical distribution is realized by the following equations (1) and (2), where w is the weight coefficient and G is the group.

$$\mu_c = \sum_{k \in G} w_k \mu_k \qquad (1)$$

$$\sigma_c^2 = \sum_{k \in G} w_k \sigma_k^2 + \sum_{k \in G} w_k (\mu_k - \mu_c)^2 \qquad (2)$$

mu: mean vector of the distribution
sigma: variance of the distribution
k: suffix for the number of the distributions in the group
c: indicates the composite (grouped) distribution
mu_k: mean vector of the distribution k
sigma_k: variance of the distribution k
mu_c: mean vector of the composite distribution
sigma_c: variance of the composite distribution
w: the weight of the distribution
w_k: the weight of the distribution k Then, the typical distribution and the positional relationship of each distribution within the group are determined and stored and held (step S503). The typical distribution is subjected to noise adaptation (PMC) conversion by a PMC method in step S504. The procedure of the PMC method is as described earlier (see FIG. 7). By using the PMC-converted typical distribution and the positional relationship determined in step S503, the position of each distribution after noise adaptation conversion is determined (step S505). The noise adaptation conversion of each distribution is realized by the following equations (3) and (4) or equations (5) and (6).

When performing adaptation of both a mean value and a variance, $$\hat{\mu}_{m,\ S+N} = \hat{\mu}_{c,\ S+N} + (\mu_{m,\ S} - \mu_{c,\ S})(\hat{\sigma}_{c,\ S+N}/\sigma_{c,\ S}) \qquad (3)$$

$$\hat{\sigma}_{m,\ S+N} = \sigma_{m,\ S}(\hat{\sigma}_{c,\ S+N}/\sigma_{c,\ S}) \qquad (4)$$

Or, when only an mean value is adapted and adaptation of a variance is not performed, $$\hat{\mu}_{m,\ S+N} = \hat{\mu}_{c,\ S+N} + (\mu_{m,\ S} - \mu_{c,\ S})(\hat{\sigma}_{c,\ S+N}/\sigma_{c,\ S}) \qquad (5)$$

$$\hat{\sigma}_{m,\ S+N} = \sigma_{m,\ S} \qquad (6)$$

where
mu: mean vector of the distribution
sigma: variance of the distribution
m: suffix for the number of distributions in the group
c: indicates the composite (grouped) distribution
S: suffix for the speech model
N: suffix for the speech model
S+N: suffix for the noise adapted speech model
^(hat): indicates the noise adaptive speech model (doubled S+N suffix, can be omitted)
^mu m,S+N: mean of the noise adaptive speech model m
^sigma_m,S+N: variance of the noise adaptive distribution m
^mu_c,S+N: mean of the noise adaptive composite distribution
^sigma_c,S+N: variance of the noise adapted composite distribution
mu_m,S: mean of the speech distribution m
sigma_m,S: variance of the speech distribution m mu_c,S: mean of the speech composite distribution sigma_c,S: variance of the speech composite distribution $\mu_{m,S}$ is the mean value of the distributions within a group before PMC conversion, $\sigma_{m,S}^2$ is the variance of the distributions within a group before PMC conversion, $\mu_{c,S}$ is the mean value of the composite distributions before PMC conversion, $\sigma_{c,S}^2$ is the variance of composite distributions before PMC conversion, $\hat{\mu}_{m,S+N}$ is the mean value of the distributions within a group after PMC conversion, $\hat{\sigma}_{m,S+N}^2$ is the variance of distributions within a group after PMC conversion, $\hat{\mu}_{c,S+N}$ is the mean value of composite distributions within a group after PMC conversion, and $\hat{\sigma}_{c,S+N}^2$ is the variance of composite distributions within a group after PMC conversion.

Thus, the noise adaptation section 204 determines, using these equations, the mean value of the distributions within a group before PMC conversion, the variance of the distributions within a group before PMC conversion, the mean value of the composite distributions before PMC conversion, the variance of composite distributions before PMC conversion, the mean value of the distributions within a group after PMC conversion, the variance of distributions within a group after PMC conversion, the mean value of composite distributions within a group after PMC conversion, and the variance of composite distributions within a group after PMC conversion.

Figure 4:
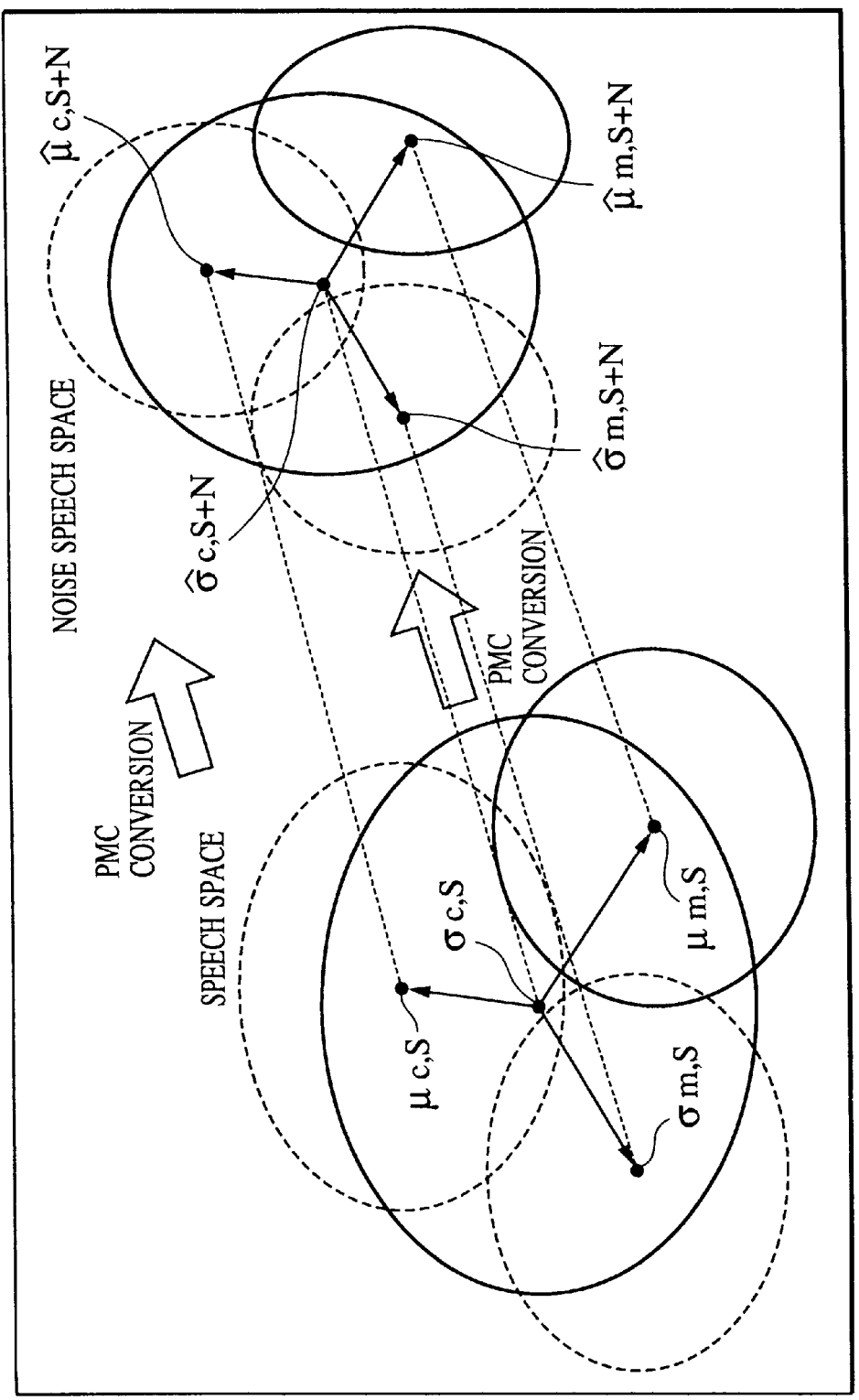
FIG. 4 is a conceptual view of a noise adaptation process according to the embodiment of the present invention.

The conceptual view of this noise adaptation method is shown in FIG. 4.

Equations 3 and 5 show that the mean of the noise adapted model of distribution m is calculated using the difference from the noise adapted composite distribution. And this difference is calculated by the difference of distribution m of the clean speech model and the composite model of the clean speech. Furthermore, this difference is normalized by the width of the composite distribution before adaptation (Sigma_c,S) and after adaptation (Sigma_c,S+N). This is done by using an approximation that the way of the noise corruption of the composite distribution is exactly the same way as that of each distribution in the group. Also the width of the area is closely related to the difference of the composite distribution before adaptation and after adaptation.

Equation 4 shows that the variance of the noise adapted model of distribution m is computed from the clean speech model of distribution m by normalizing the width using the composite distribution before adaptation (Sigma_c,S) and after adaptation (Sigma_c,S+N). This is using an approximation that the way of the noise corruption of the composite distribution is exactly the same way as that of each distribution in the group. In eq. 5, it indicates that the variance is not harmed by the noise.

FIG. 4 shows the image of the process of the proposed method. The left side is the clean speech space and the right side is the noisy speech space. The adaptation from clean speech to noisy speech is realized by the PMC conversion. The three small circles (one rigid line and two dot lines) in the left side indicate each distribution of the clean speech model in the group. The three small circles (one rigid line and two dot lines) in the right side indicate each distribution of the noisy (noise adapted) speech model in the group. The large circles on the three small circles indicate the composite distribution: the left one is the composite distribution of the clean speech model, the right one is the PMC-converted composite distribution created by converting the composite distribution of clean speech model using PMC. The arrows are the difference vectors between the composite distribution and the member distribution in the group. The figure shows that the rigid small circle in the left side is converted into the rigid small circle in the right side.

The proposed method performs the following steps:

1) create the composite model (left large circle) from the clean distributions (left small circles) by eqs 1 and 2.

2) perform PMC conversion on the composite distribution (left large circle) and create the noise adapted composite distribution (right large circle).

3) determine each noise adapted distribution (right three small circles) by eqs 3 and 4, or 5 and 6, using the relation of the clean speech composite model (left large circle) and each clean speech distributions and the relation of the composite clean speech distribution (left large circle) and composite PMC-converted speech distribution (right large circle).

Figure 5:
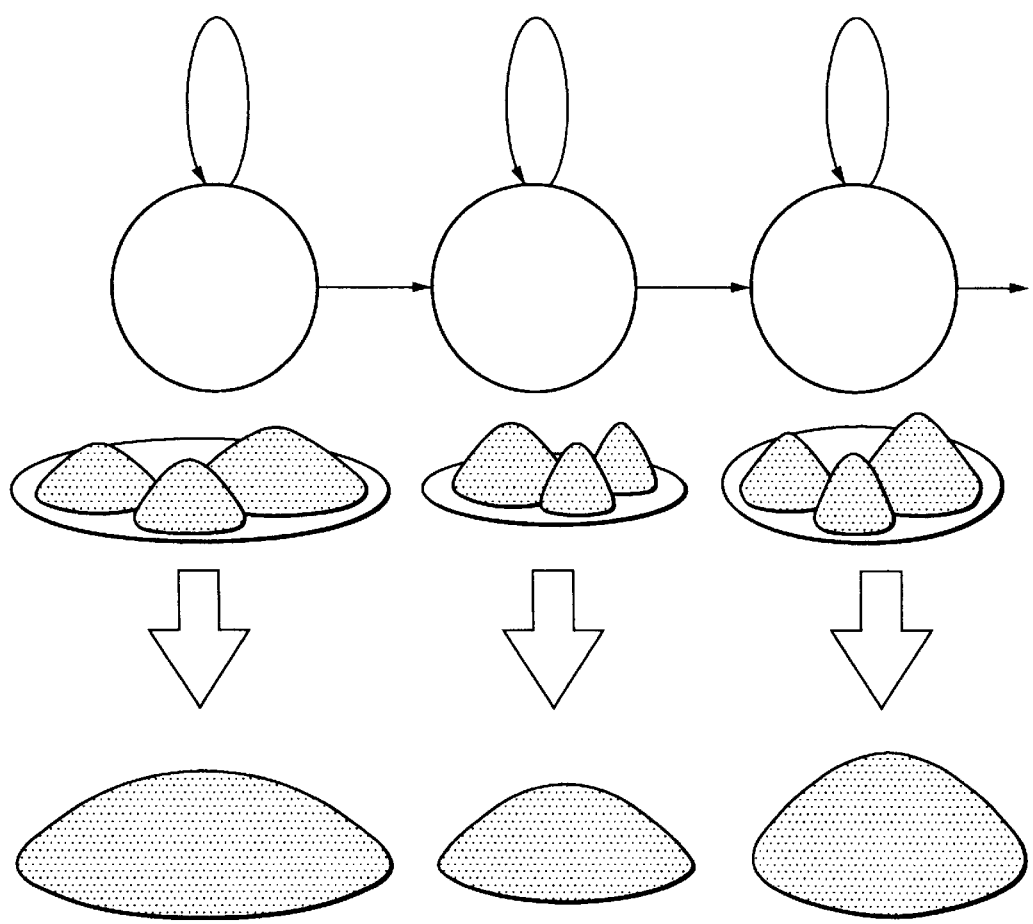
FIG. 5 shows the production of typical distributions with states formed into groups according to the embodiment of the present invention.

Regarding the grouping of distributions in step S501, the present invention includes a method of producing a typical distribution with each state of a speech model as a group, as shown in FIG. 5 so that distributions belonging to each state are formed into one group. The present invention also includes an embodiment in which step S501 produces a typical distribution by hierarchically clustering (Levels 0, 1 and 2) neighboring distributions, as shown in FIG. 6, and others.

The three circles with arc-arrows in FIG. 5 show the continuous HMM of three states with three distribution components in each state. The circle is the state of the HMM and the arrows are the transition arc between the states. Here, it shows an example of grouping, which in the group is the state of the HMM. If the group is the state of the HMM, the composite distribution will be created for each state using the distribution in each state as shown in FIG. 5.

Figure 6:
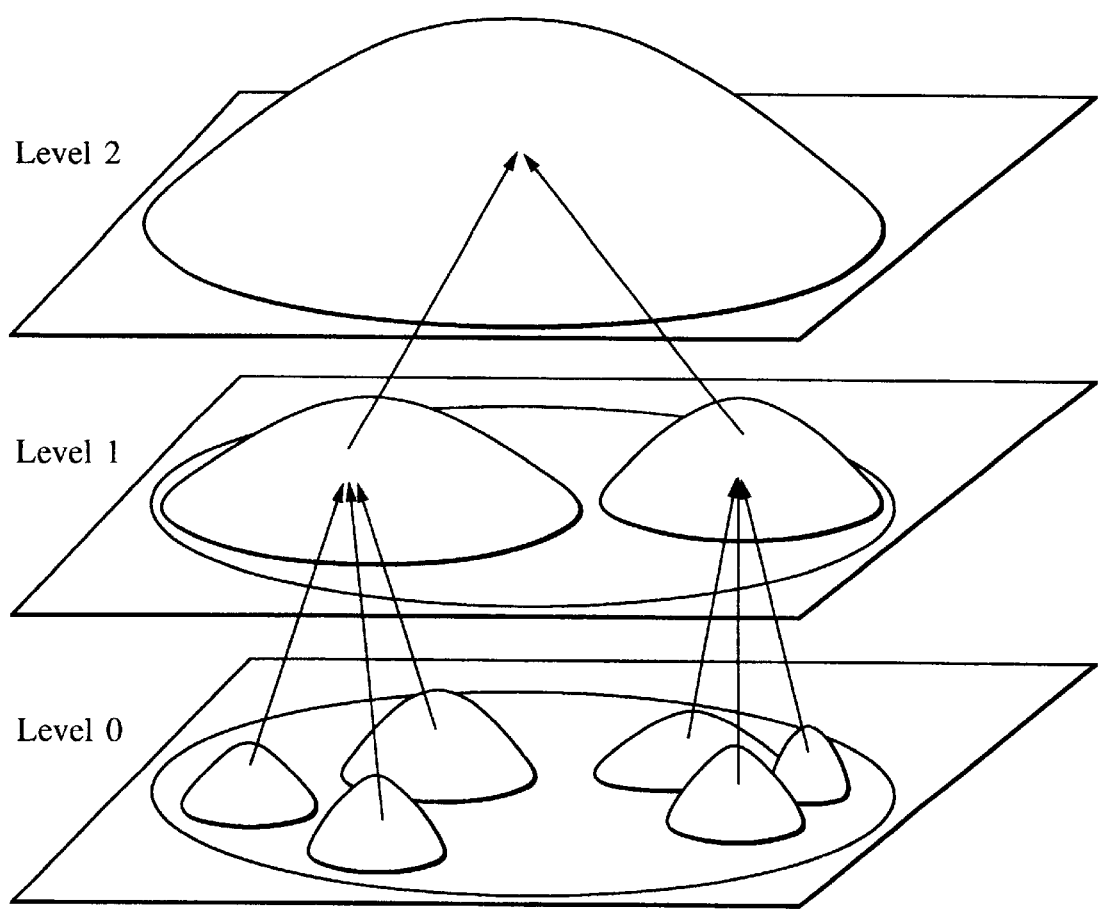
FIG. 6 shows the production of a typical distribution by hierarchically clustering neighboring distributions according to the embodiment of the present invention.

FIG. 6 shows somewhat different clustering of distributions to that of FIG. 5. The clustering is performed by the very well-known LBG hierarchical clustering algorithm, which is a method of grouping of neighboring distributions. The algorithm separates the whole distributions shown at the bottom (level 0) of the figure at some group in each level of the hierarchy. In the case, the top level (level 2) of all distributions are grouped in one group and only one composite distribution is created. At the second layer (level 1), it is grouped in 2 group and two composite distributions are created from the belonging distributions in level 0, linked by the arrows. The grouping can be determined by the level of the clustering layer or step.

The difference of creating the composite distribution using 1) the grouping by state shown in FIG. 5 with 2) the grouping the hierarchical clustering shown in FIG. 6 is the optimality of grouping and the creation of the composite distribution. Using the second method it can cluster in a more optimal way in the sense of the clustering distribution, which means that the clustering distribution will be smaller than the method 1). And also in the 2nd method, we can select the number of groups, however in the first step method the number of the groups is fixed to the number of the states in the total speech model.

Next, the experimental results of this embodiment will be described.

A state share triphone HMM (3 states, 6 distributions) of the total number greater than 710 of all the states learned using speech data without noise was noise-adapted/environment-adapted (MCMS-PMC: Journal of Acoustic Society of Japan H8 Spring, 2-5-15, pp.87–88, March 1996), and an experiment for recognizing 520 words spoken on telephone was carried out.

Table 1 below shows the percentage of the speech recognition accuracy (%) and the ratio of time required for PMC conversion.

TABLE 1

| — | Recognition Percentage (%) | Conversion Time Ratio |
|---|---|---|
| Conventional PMC Method | 90.3% | 100.0 |
| Proposed PMC Method | 89.1% | 35.8 |

As is clear from this Table 1, the PMC method of this embodiment is capable of reducing the conversion time considerably, and the speech recognition percentage is nearly equal to that of the conventional PMC method.

The present invention is not limited to the embodiment shown in the figures, and various modifications are possible. Examples of such modifications include the following.

(1) In this embodiment, grouping of distributions is performed so as to form 1 distribution for 1 group. However, the noise adaptation section 204 can determine that a particular distribution is present within a plurality of neighboring groups.

(2) In this embodiment, in the case where grouping of distributions is performed by section 204 so that one distribution is present within a plurality of groups, when a plurality of converted distributions are produced by section 204 by conversion, equations which determine the gravity and the mean value of the distributions and which determine a typical distribution may be used by section 204 to produce one distribution after noise adaptation using those distributions.

What is claimed is:

1. A speech processing apparatus, comprising:
   speech model production means for extracting a non-speech interval from input data and producing a noise model by using the data of the extracted interval;
   composite distribution production means for dividing the distributions of a speech model into a plurality of groups, and producing a composite distribution of each group, and determining the positional relationship of each distribution and the produced composite distribution within each group;
   storing means for storing said each composite distribution and the positional relationship of each distribution and the new composite distribution within the group;
   PMC conversion means for PMC-converting said each produced composite distribution;
   noise-adaptive speech model production means for producing a noise-adaptive speech model on the basis of the composite distribution which is PMC-converted by said PMC conversion means and the positional relationship stored by said storing means; and
   output means for determining and outputting a recognition candidate and a likelihood that the recognition candidate correctly corresponds to the input speech data by using the noise-adaptive speech model produced by said noise-adaptive speech model production means.

2. A speech processing apparatus according to claim 1, further comprising:
   speech input means for inputting speech data;
   sound analysis means for analyzing speech data input by said speech input means;
   output probability computation means for determining the output the probability that the noise-adaptive speech model corresponds to the input speech data analyzed by said analyzing means; and
   means for determining a recognition result using the noise-adaptive speech model by performing a linguistic search for the input speech data.

3. A speech processing apparatus according to claim 2, wherein said output means determine the recognition result for the input speech data using the noise-adaptive speech model and a dictionary and grammar as a linguistic constraint.

4. A speech processing apparatus according to claim 1, wherein said noise-adaptive speech model production means includes determination means for determining:
   the vectors of difference between the composite distribution and each distribution within the group before PMC conversion;
   the mean value and the variance of the composite distributions before PMC conversion; and
   the mean value and the variance of the typical distributions after PMC conversion, and produces the mean value and the variance of each composite distribution (noise adapted) within a group.

5. A speech processing apparatus according to claim 4, wherein said composite distribution production means forms distributions belonging to each state of the speech model into one group.

6. A speech processing apparatus according to claim 1, wherein said composite distribution production means includes distribution determination means for determining that a particular distribution belongs to a plurality of neighboring groups, and distribution production means for producing one final distribution from a plurality of converted distributions when the distribution belonging to said plurality of groups is converted by each composite distribution.

7. A speech processing apparatus according to claim 1, wherein said composite distribution production means forms distributions belonging to each state of the speech model into one group.

8. A speech processing apparatus according to claim 1, wherein a speech model is a unit modeled by HMM to realize speech recognition, speech recognition for numbers usually use number as a unit, in speech recognition for some specific application with limited vocabulary sometimes the unit is the word, and recent speech recognition for large vocabulary usually use phoneme or contextual phoneme models like triphone as a unit.

9. A speech processing method, comprising the steps of:
   producing a noise model by using data on a non-speech interval extracted from input speech data;
   dividing the distribution of a speech model into a plurality of groups and producing a composite distribution of each group and determining the positional relationship of each distribution within each group;
   storing each composite distribution and the positional relationships of the distributions within the groups;
   PMC-converting said produced composite distribution;
   producing a noise-adaptive speech model on the basis of said PMC-converted composite distribution and the stored positional relationship; and
   determining and outputting a recognition candidate and a likelihood that the recognition candidate correctly corresponds to the input speech data by using the produced noise-adaptive speech model.

10. A speech processing method according to claim 9, wherein said noise-adaptive speech model is produced by using:
    the vectors of difference between the composite distribution and each distribution within the group before PMC conversion;

the mean value and the variance of the composite distributions before PMC conversion; and the mean value and the variance of the composite distributions after PMC conversion, and produces the mean value and the variance of each composite distributions (noise adapted) within a group.

11. A speech processing method according to claim 10, wherein said dividing step forms distributions belonging to each state of the speech model into one group.

12. A speech processing method according to claim 9, wherein a speech model is a unit modeled by HMM to realize speech recognition, speech recognition for numbers usually use number as a unit, in speech recognition for some specific application with limited vocabulary sometimes the unit is the word, and recent speech recognition for large vocabulary usually use phoneme or contextual phoneme models like triphone as a unit.

13. A speech processing method according to claim 9, wherein said dividing step determines a particular distribution so as to belong to a plurality of neighboring groups, and when the distribution belonging to said plurality of groups is converted by each composite distribution, one final distribution is made to be said composite distribution from the plurality of converted distributions.

14. A speech processing method according to claim 9, wherein said dividing step forms distributions belonging to each state of the speech model into one group.

15. A speech processing method according to claim 9, further comprising the steps of:

inputting speech data;

analyzing the input speech data;

determining an analysis result of said analyzing step and determining the output recognition probability that the recognition candidate correctly corresponds to the input speech data analyzed in said analyzing step and the analysis result determined therefrom; and determining a recognition result using the noise-adaptive speech model by performing a linguistic search for the input speech data.

16. A speech processing method according to claim 15, further comprising the step of: determining the recognition result for the input speech data using the noise-adaptive speech model and a dictionary and grammar as a linguistic constraint.

17. A computer usable storage medium having computer readable program code means embodied therein, the program instructing a computer to perform speech processing, said computer readable program code means comprising:

first program code means for instructing the computer to extract a noise-speech interval from input speech data and produce a noise model by using data of the extracted interval;

second program code means for instructing the computer to divide the distributions of a speech model into a plurality of groups, to produce a composite distribution of each group, and to determine the positional relationship of each distribution within each group;

third program code means for instructing the computer to store each composite distribution and the positional relationships of each distribution within the group;

fourth program code means for instructing the computer to PMC-convert the produced composite distribution;

fifth program code means for instructing the computer to produce a noise-adaptive speech model on the basis of the composite distribution which is caused to be PMC-converted by said fourth program code means and the positional relationship caused to be stored by said third program code means; and sixth program code means for causing the computer to determine and output a recognition candidate and a likelihood that the recognition candidate correctly corresponds to the input speech data by using the noise-adaptive speech model caused to be produced by said fifth program code means.

18. A medium according to claim 17, wherein said second program code means causes the computer to form distributions belonging to each state of the speech model into one group.

19. A storage medium according to claim 17, further comprising:

seventh program code means for causing the computer to input speech data;

eighth program code means for causing the computer to analyze the speech data caused to input by said seventh program code means;

ninth program code means for causing the computer to determine a sound analysis result from the analysis caused to occur by said eighth program code means and to cause the computer to output a recognition probability that the noise-adaptive speech model corresponds to the input speech data caused to be analyzed by said eighth program code means and the analysis result caused to be produced by said ninth program code means; and means for determining a recognition result using the noise-adaptive speech model by performing a linguistic search for the input speech data.

20. A medium according to claim 19, wherein said output means determines the recognition result of the input speech data using the noise-adaptive speech model and a dictionary and grammar as a linguistic constraint.

21. A medium according to claim 17, wherein said fifth program code means comprises determining program code means for causing the computer to determine:

the vectors of difference between the composite distribution and each distribution within the group before PMC conversion;

the mean value and the variance of the composite distributions before PMC conversion; and the mean value and the variance of the composite distributions after PMC conversion.

22. A medium according to claim 21, wherein said second program code means causes the computer to form distributions belonging to each state of the speech model into one group.

23. A medium according to claim 17, wherein said second program code means includes distribution determination program code for causing the computer to determine that a particular distribution belongs to a plurality of neighboring groups, and distribution production program code means for causing the computer to produce one final distribution from a plurality of converted distributions when the distribution belonging to the plurality of groups is converted by each composite distribution.

24. A storage medium according to claim 17, wherein a speech model is a unit modeled by HMM to realize speech recognition, speech recognition for numbers usually use number as a unit, in speech recognition for some specific application with limited vocabulary sometimes the unit is the word, and recent speech recognition for large vocabulary usually use phoneme or contextual phoneme models like triphone as a unit.

* * * * *

UNITED STATES PATENT AND TRADEMARK OFFICE
CERTIFICATE OF CORRECTION

PATENT NO. : 5,956,679

DATED : September 21, 1999

INVENTOR(S) : YASUHIRO KOMORI, ET AL.

Page 1 of 2

It is certified that error appears in the above-identified patent and that said Letters Patent is hereby corrected as shown below:

In drawings,

SHEET 1 OF THE DRAWINGS, FIGURE 1:

In box 105, "LANGUISTIC" should read --LINGUISTIC--.

SHEET 2 OF THE DRAWINGS, FIGURE 2:

In box S304, "LANGUISTIC" should read --LINGUISTIC--.

COLUMN 2:

Line 51, "determine" should read --determines--.

COLUMN 4:

Line 32, "determine" should read --determines--.

COLUMN 5:

Line 40, "the the" should read --the--.

COLUMN 6:

Line 58, "^mu m," should read --^mu_m,--.

COLUMN 7:

Line 4, "$\sigma_{m,s}2$" should read --$\sigma^2_{m,s}$--.
Line 7, "$\sigma_{c,s}2$" should read --$\sigma^2_{c,s}$--.
Line 9, "$\hat{\sigma}_{m,s+N}2$" should read --$\hat{\sigma}^2_{m,s+N}$--.
Line 12, "$\hat{\sigma}_{c,s+N}2$" should read --$\hat{\sigma}^2_{c,s+N}$--.

UNITED STATES PATENT AND TRADEMARK OFFICE
CERTIFICATE OF CORRECTION

PATENT NO.   : 5,956,679

DATED        : September 21, 1999

INVENTOR(S)  : YASUHIRO KOMORI, ET AL.

It is certified that error appears in the above-identified patent and that said Letters Patent is hereby corrected as shown below:

COLUMN 8:

Line 47, "grouping" should read --by grouping--.

COLUMN 9:

Line 65, "output the" should read --output--.

COLUMN 10:

Line 5, "determine" should read --determines--.

Signed and Sealed this

Eighteenth Day of July, 2000

Attest:

Q. TODD DICKINSON

*Attesting Officer*                *Director of Patents and Trademarks*